(12) United States Patent
Mueller

(10) Patent No.: US 9,352,964 B2
(45) Date of Patent: May 31, 2016

(54) DEVICE AND PROCESS FOR POSITIONING INDIVIDUAL PARTICLES ON A SUBSTRATE

(76) Inventor: Markus Robert Mueller, Zurich (CH)

(*) Notice: Subject to any disclaimer, the term of this patent is extended or adjusted under 35 U.S.C. 154(b) by 28 days.

(21) Appl. No.: 13/418,711

(22) Filed: Mar. 13, 2012

(65) Prior Publication Data

US 2012/0213950 A1 Aug. 23, 2012

(51) Int. Cl.
*B82Y 40/00* (2011.01)
*B82B 3/00* (2006.01)
*B82Y 30/00* (2011.01)

(52) U.S. Cl.
CPC . *B82B 3/00* (2013.01); *B82Y 30/00* (2013.01); *B82Y 40/00* (2013.01)

(58) Field of Classification Search
USPC ........... 250/492.2, 492.3, 492.21, 492.1, 251, 250/396 R
See application file for complete search history.

(56) References Cited

U.S. PATENT DOCUMENTS

| | | | | |
|---|---|---|---|---|
| 4,490,608 A * | 12/1984 | Yeadon et al. | ................ | 250/235 |
| 4,943,161 A * | 7/1990 | Michaelis et al. | ............ | 356/437 |
| 5,306,921 A * | 4/1994 | Tanaka | .................... | H01J 37/08 250/423 R |
| 5,723,862 A * | 3/1998 | Forman | ................ | H01J 49/305 250/294 |
| 6,441,384 B1 * | 8/2002 | Kojima | ................. | B82Y 10/00 250/492.22 |
| 7,493,590 B1 * | 2/2009 | Hess et al. | ....................... | 716/53 |
| 7,498,590 B2 * | 3/2009 | Dzengeleski | ............ | 250/492.21 |
| 7,615,763 B2 * | 11/2009 | Vanderberg et al. | ..... | 250/492.21 |
| 7,750,320 B2 * | 7/2010 | Ferrara et al. | ............ | 250/492.21 |
| 8,110,814 B2 * | 2/2012 | Ward et al. | ................. | 250/423 F |
| 2005/0139789 A1 * | 6/2005 | Nagano et al. | ........... | 250/492.23 |
| 2010/0181470 A1 * | 7/2010 | Farley et al. | ............... | 250/252.1 |

FOREIGN PATENT DOCUMENTS

CH 701 762 3/2011

* cited by examiner

*Primary Examiner* — Phillip A Johnston
*Assistant Examiner* — Hsien Tsai
(74) *Attorney, Agent, or Firm* — Collard & Roe, P.C.

(57) ABSTRACT

A device and process for positioning individual particles on a substrate is proposed. The device is equipped with at least one particle source which isolates particles of a defined material, with a focusing unit with an entry window facing the particle source and an exit window facing away from the particle source, with a substrate holder to hold the substrate, wherein the focusing unit guides the particles entering through its entry window into defined positions on the substrate, with at least one deflection unit arranged between the particle source and the focusing unit with an entry window facing the particle source and an exit window on the deflector unit facing away from the particle source, wherein the deflector unit preconditions the particles entering through its entry window before they reach the focusing unit.

28 Claims, 4 Drawing Sheets

DEVICE AND PROCESS FOR POSITIONING INDIVIDUAL PARTICLES ON A SUBSTRATE

Figure 1:
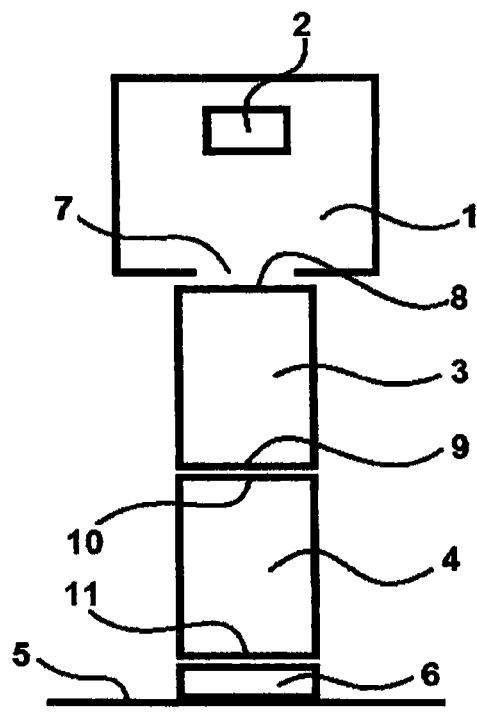

A device and process for positioning individual particles on a substrate is proposed.

The deposition or positioning of individual particles, especially atoms and molecules, electrons, protons or neutrons, at or on a substrate is known from thin-film technology, for example. Here, thin layers of different materials are created on a substrate by means of physical and/or chemical processes. Thin films of this type are used for example in semiconductor technology, in microprocessors, in thin-film solar cells, in medical technology, in the manufacture of sensors and in nanotechnology.

It proves a disadvantage that the layers applied need to be partly removed again in order to create structures. A combination of photolithographic processes and wet-chemical processes is used for this. If the structures consist of several layers, these steps are often correspondingly repeated. During the photolithographic and wet-chemical processes, large quantities of waste materials occur and need to be disposed of. Furthermore, the creation of ever smaller structures is limited by the wavelength of the radiation used in the photolithographic processes. The smaller the structure, the smaller the wavelength of the radiation must be.

The invention is prompted by the task of providing a device and a process with which particles, especially atoms and molecules, can be positioned on a substrate with such precision that the controlled, detailed composing of material structures from individual particles of the same or of different materials is made possible, without the need to use photolithographic and wet-chemical processes.

This task is solved by a device as described herein and by a process as described herein. The device is characterized in that it is equipped with at least one particle source, with at least one focusing unit, with at least one substrate holder, with at least one deflector unit, with at least one measuring unit and with at least one controller. The particles are provided and isolated in the particle source. On the basis of their initial speed, they move in a specific direction. They reach the deflector unit through an entry window. The isolated particles are guided onto a defined course by the deflector unit, during which they are preconditioned. This preconditioning is performed in particular based on the path covered by the particles, which is determined by their time-place function, as well as their speed and, if appropriate, their acceleration. In each case this applies in three dimensions. The particles leave the deflector unit through the exit window and enter the focusing unit through its entry window. As a result of preconditioning in the deflector unit, the particles pass through the entry window of the focusing unit in defined positions and with a defined speed. As a result, the particles in the focusing unit are deflected in such a way that they are arranged on the substrate in the defined positions. The position or location and/or speed of the particles is determined by the measuring unit. The controller compares the readings with the target values and governs the deflector unit based on this comparison. The measuring unit is equipped with sensors and/or encoders that can be located at various positions in the device. They are arranged preferably before the deflector unit and/or in the deflector unit. It is beneficial that there are no sensors or transducer for the measuring unit in the focusing unit, as a result of which the positioning of the particles on the substrate is not hindered.

If particles of a particular type, all exhibiting the same mass and the same charge, are deposited on the substrate, the particles can for example be conditioned in the deflector unit in such a way that they already exhibit qualitatively the same spacings at the exit window of the deflector unit as in their defined positions on the substrate. The spacings are merely greater, by a factor that is the same for all spacings. In the focusing unit, the spacings are all reduced by a given factor with the result that the spacings of the particles' positions at the exit window of the focusing unit correspond to the defined spacings of the particles on the substrate.

Inaccuracies or errors that may occur in the focusing unit during positioning of the particles on the substrate are eliminated by the deflector unit. To that end, the particles are already deflected in the deflector unit in such a way that the inaccuracies or errors in the focusing unit are minimized.

The isolated particles are deposited by the deflector unit, the measuring unit, the controller and the focusing unit in an exact position on the substrate. Positioning is performed with an accuracy in the range of the particle's diameter. This is for example in the range of 1 nm or less. Not only are the particles positioned in a very specific position on the substrate; they are also connected to another very specific particle on the substrate.

Either only identical or only different particles may be provided. Different particles are created preferably by means of several particle depots. The latter may be located in one or in various different particle sources.

Isolating of the particles in the particle source upon separation from the particle depot is performed in such a way that controlled, positionally accurate deflection of the particles in the deflector unit is made possible. The number of particles discharged by the particle source to the deflector unit per time unit is preferably defined and maintained. Furthermore, the parameters of the particles discharged by the particle source, such as position, speed, acceleration, must be defined and maintained as precisely as possible. It is possible for only one particle at a certain time to leave the particle source, or for several isolated particles to leave the particle source simultaneously.

In the deflector unit, the particles are exposed to forces that impose a specific path upon the particles. The forces are defined and set with such precision that the particles comply with specific conditions regarding location and/or speed when they pass through the exit window of the deflector unit. The conditions may vary from particle to particle. In the focusing unit, the particles are further conditioned so that the desired positions on the substrate are achieved.

The measuring unit determines the location and speed of the particles in the deflector unit in various positions. The fields generated in the deflector unit that supply the forces acting on the particles can be adjusted by means of a controller and the readings taken by the measuring unit. If the path of the particles deviates from the defined path, the deflector unit is set and governed by the controller.

The entry window of the focusing unit is located preferably immediately at the exit window of the deflector unit. As a result, the positions of the particles at the exit window of the deflector unit correspond to the positions of the particles at the entry window of the focusing unit.

The device is characterized in that the particles are deposited exactly in the desired positions on the substrate. The layers are therefore built up not over the whole surface, as in the state of the art, but instead particle by particle. The particles are only deposited in those positions in which a structure is to be created. In this instance the subsequent removal of parts of a layer, as is necessary with known processes, is therefore avoided. Furthermore, the device according to the invention means that very small structures can be created with greater accuracy than with known devices and processes.

With the device according to the invention, identical or different particles can be deposited on a substrate. A structure of different materials can thus be built up on the substrate, particle by particle, without the need to remove the substrate from the substrate holder in between stages. Repositioning and realignment of the substrate between the deposition processes for particles of different materials, as is necessary with known processes and devices, is therefore avoided. A clean room in which the various processing stages for creating a structure take place is likewise not necessary because the entire structure is produced in the device. It therefore suffices if a chamber surrounding the deflector unit, focusing unit and substrate holder meets the applicable cleanliness requirements.

By means of the device according to the invention and the process according to the invention, the particles can be positioned not only on a flat surface, but also on three-dimensional surfaces.

In a preferred form, the device is equipped with a chamber in which at least the deflector unit, the focusing unit and the substrate holder are arranged. It may in particular be a vacuum chamber equipped with appropriate pumps. This prevents undesirable particles from being deposited on the substrate. The particle source can be arranged wholly or partly inside the chamber or entirely outside the chamber. The chamber can be equipped with gates for introducing the substrate into the vacuum chamber and passing it back out of the vacuum chamber. The gates can for example be governed by the controller.

A gas or a mixture of gases can be introduced into the device to support the positioning of the particles or to be arranged together with the particles on the substrate.

The device according to the invention can for example be used to produce electronic circuits, integrated circuits, electrical components, microprocessors, memory devices, energy stores, ultrasonic transmitters, ultrasonic receivers, communication devices, metamaterials, chemical elements, medicines, implants, optical elements, nanostructures, in particular nanofingers, nanotubes, nanomotors, nanorobots, graphene components.

According to an advantageous embodiment of the invention, the particle source is equipped with at least one particle depot from which the individual particles are separated. The particle depot can contain a solid, liquid or gaseous substance. The separation of individual particles from the depot is performed for example by heating a solid or liquid substance up to its transition into the gas phase. In addition, individual particles can also be produced by cathode atomization, sputtering or in plasma. Either only identical or different particles may be produced. Different particles are created preferably by means of several particle depots. The latter may be located in one or in various different particle sources. The particle depot can be connected to a particle magazine. The particle magazine can exhibit several sections, with each section containing a different substance. In this way, different substances can be led in succession into the particle depot and thus a variety of particles deposited on the substrate.

According to an advantageous embodiment of the invention, the device is equipped with an ionization unit by which the particles are ionized. For this purpose the ionization unit can be integrated into the particle source or be arranged between the particle source and the deflector unit. The result is that ionization of the particles takes place either as soon as they are isolated in the particle source or only after their isolation and after they have left the particle source.

According to a further advantageous embodiment of the invention, the ionization unit is equipped with at least one laser. Here, the wavelength of the laser is set in such a way that the energy is for example sufficient to remove an electron from the shell of the particle.

According to a further advantageous embodiment of the invention, the device is equipped with a magnetization unit that imparts the individual particles with a magnetic moment. For this purpose the magnetization unit can either be integrated into the particle source or be arranged between the particle source and the deflector unit. Depending on the position of the magnetization unit, magnetization of the particles takes place as soon as they are isolated in the particle source or only after they have left the particle source.

According to a further advantageous embodiment of the invention, the device is equipped with a filter unit that allows particles with certain characteristics to pass and separates other particles. This prevents undesirable particles from being deposited on the substrate. In addition, particles of an unsuitable initial condition can be trapped.

According to a further advantageous embodiment of the invention, the deflector unit is equipped with electrical components that generate electromagnetic fields. In the electromagnetic fields, the ionized and possibly magnetized particles are specifically guided into a path such that they are positioned on the substrate with atomic or molecular precision.

According to a further advantageous embodiment of the invention, the electrical components are electrostatic components and/or electromagnetic components. The electrostatic components include for example electrodes or electrostatic deflector plates. The electromagnetic components include for example coils. Electrostatic and electromagnetic components may alternate. The electrostatic components can for example also be made from a plastic material that is known by the designation FET material. This material can be imparted permanently with a constant electrical voltage.

According to a further advantageous embodiment of the invention, the electrical components are supplied with direct current or alternating current. In the case of direct current, the electrical components generate constant electromagnetic fields. In the case of alternating current, the electrical components generate any form of electromagnetic alternating fields.

According to a further advantageous embodiment of the invention, the electrical components are for example coils, coils with magnetic core, annular yokes, saddle coils or electrodes.

According to a further advantageous embodiment of the invention, the substrate holder is equipped with at least one electrical connection via which the substrate holder can be connected to a current/voltage source. This allows the electrical potential of the substrate holder to be defined and set. If a substrate arranged on the substrate holder consists of an electrically conductive material, the electrical potential of the substrate can likewise be defined and set. This can promote the positioning of particles on the substrate. Proof of the impact of the particles with electrical charge on the substrate can furthermore be furnished.

If the substrate holder should become charged undesirably, it can be neutralized in a suitable way. This can be achieved for example with electrons which are fed into the substrate holder.

According to a further advantageous embodiment of the invention, the measuring unit is equipped with at least one position sensor that determines the position of the particles in the deflector unit in three dimensions. In this way, before deposition of a particle on the substrate it is possible to check whether a particle is located on a path that leads to a designated position of the particle on the substrate. If this condition is not met, the fields of the deflector unit can be correspondingly modified. If there are several position sensors arranged on the deflector unit, the path along which a particle moves from the particle source to the substrate can be detected.

According to a further advantageous embodiment of the invention, the measuring unit is equipped with at least one speed sensor that determines the speed of the particles in the deflector unit in three dimensions.

According to a further advantageous embodiment of the invention, the device is equipped with further sensors that for example determine the acceleration, the charge or the mass of the particles. These sensors can be integrated into the deflector unit or be arranged outside the deflector unit.

According to a further advantageous embodiment of the invention, the substrate holder is arranged in a movable manner. Thus, the substrate holder can for example be arranged in a pivoting, sliding or tilting manner. This allows the substrate to be specifically aligned relative to the deflector unit. The movement of the substrate holder is monitored and governed preferably by the controller. Once the substrate holder has been adjusted, it is fixed in position. So that the particles are deposited exactly on the substrate arranged on the substrate holder, the substrate holder must be fixed with a very high degree of precision. In particular, there is no play in the substrate holder.

According to a further advantageous embodiment of the invention, the device is equipped with a temperature control unit via which the temperature of the particle source and/or deflector unit and/or focusing unit and/or substrate holder can be adjusted. The temperature control unit can include a heating unit and/or a cooling unit. In this way, the temperature of the particle source and/or deflector unit and/or focusing unit and/or substrate holder can be set and defined in such a way that the exact positioning of the particles on the substrate is promoted.

According to an advantageous embodiment of the invention, the boundary conditions and process parameters are recorded and stored in the controller. These include for example the dimensions of the device, the type, mass and charge of the particles, the intended positions of the particles on the substrate, the forces acting on the particles, the dimensions of the deflector unit and focusing unit, and the inaccuracy or error of the focusing unit in the positionally accurate deposition of the particles on the substrate. This data is determined in a calibration process.

According to a further advantageous embodiment of the invention, the device is used as a microscope. To that end the device is equipped with a particle source which supplies electrons, protons or positrons. The locations or positions and the speeds of these particles are determined in three dimensions with the measuring unit in the deflector unit. The readings are passed on to the controller. The particles reach an object that is to be investigated, arranged on the substrate holder, in a precisely defined location and with a defined speed and at a defined angle. The boundary conditions and process parameters are determined by means of a calibration process. This is performed using a known test object. For example a flat silicon monocrystal surface can be used for calibration. Close to the substrate holder, at least one detector is arranged, and detects electrons, photons and/or electrical fields. If several detectors are to be provided, they may be arranged at various angles or at various distances relative to the substrate holder. They can be arranged in front of or behind the substrate holder. The object to be investigated can be kept at a given electrical potential. Charges, currents or voltage changes can be detected at the object. Generation of an image of the object to be investigated is performed by means of a numerical computation by the controller. In the calibration process, for every point of collision the distance or path that the particles need to cover in order to reach a defined position is measured, computed and stored, taking into account inaccuracies or errors in the device. The image determined from this data can also be displayed three-dimensionally. Dimensions that are smaller than one atom can be identified. In contrast to known microscopes, rather than the specific positions of the particles on the object to be measured, here the expected positions of the particles colliding with the object are calculated by the controller, using the data obtained in the calibration process. Use is made of the fact that the deviations and errors in the device are known from the calibration process and are stored in the controller. The individual time differences between a particle reaching the object to be investigated and a detector are measured and taken into account when computing an image.

Further advantages and advantageous embodiments of the invention can be obtained from the following description, the drawing and the claims.

DRAWING

Figure 2:
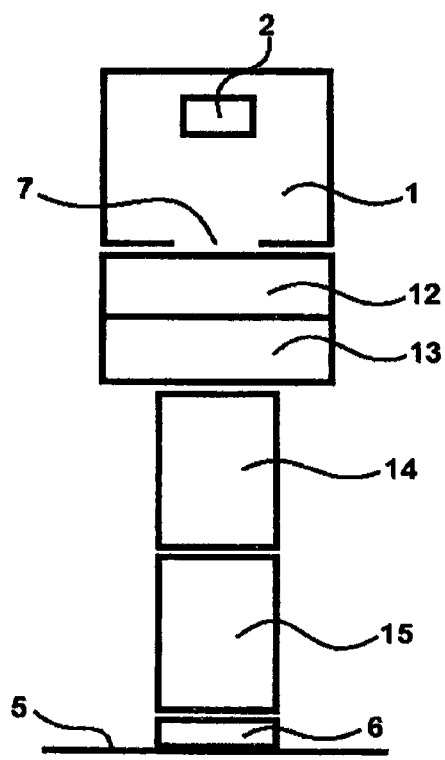
Figure 3:
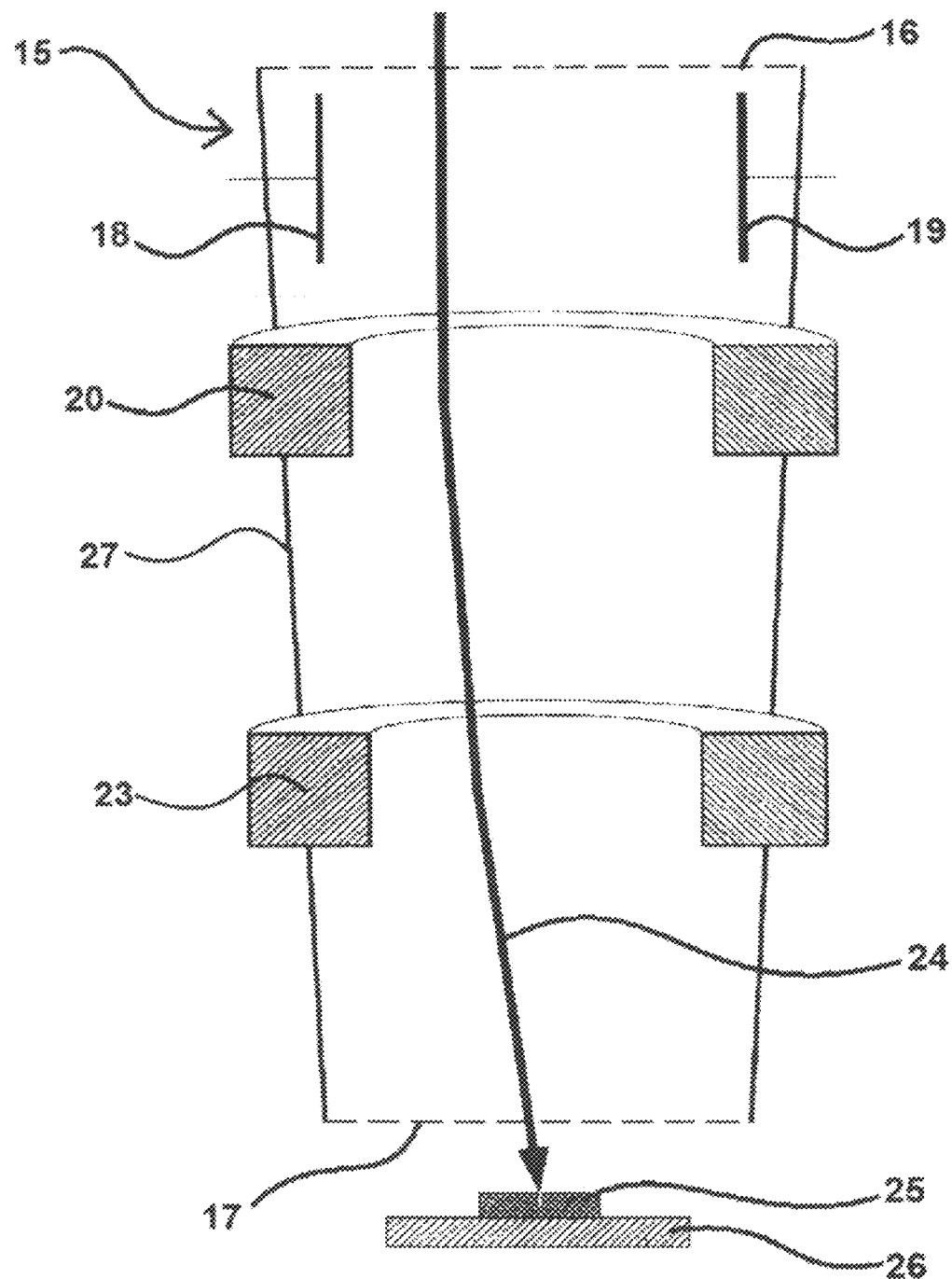
Figure 4:
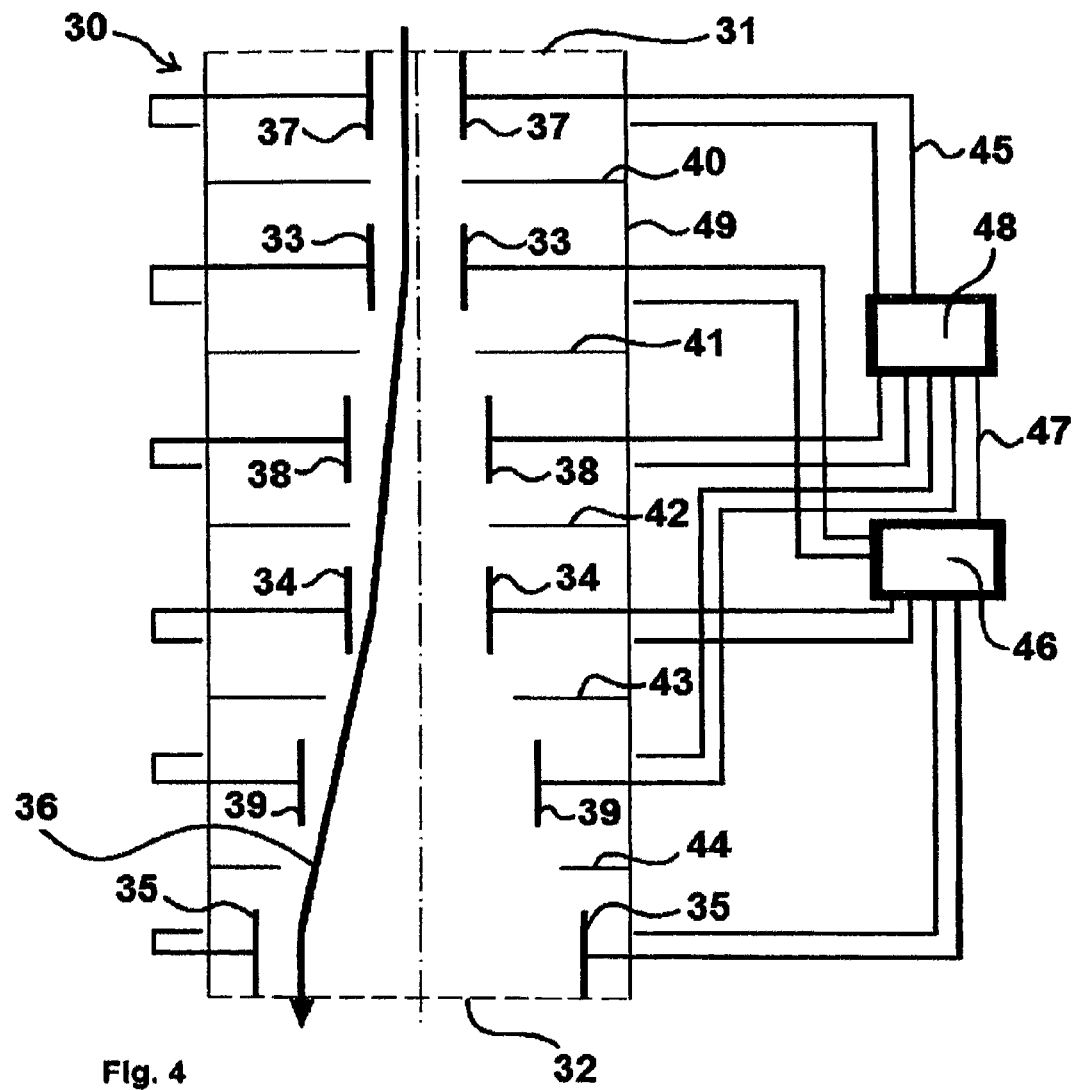
Figure 5:
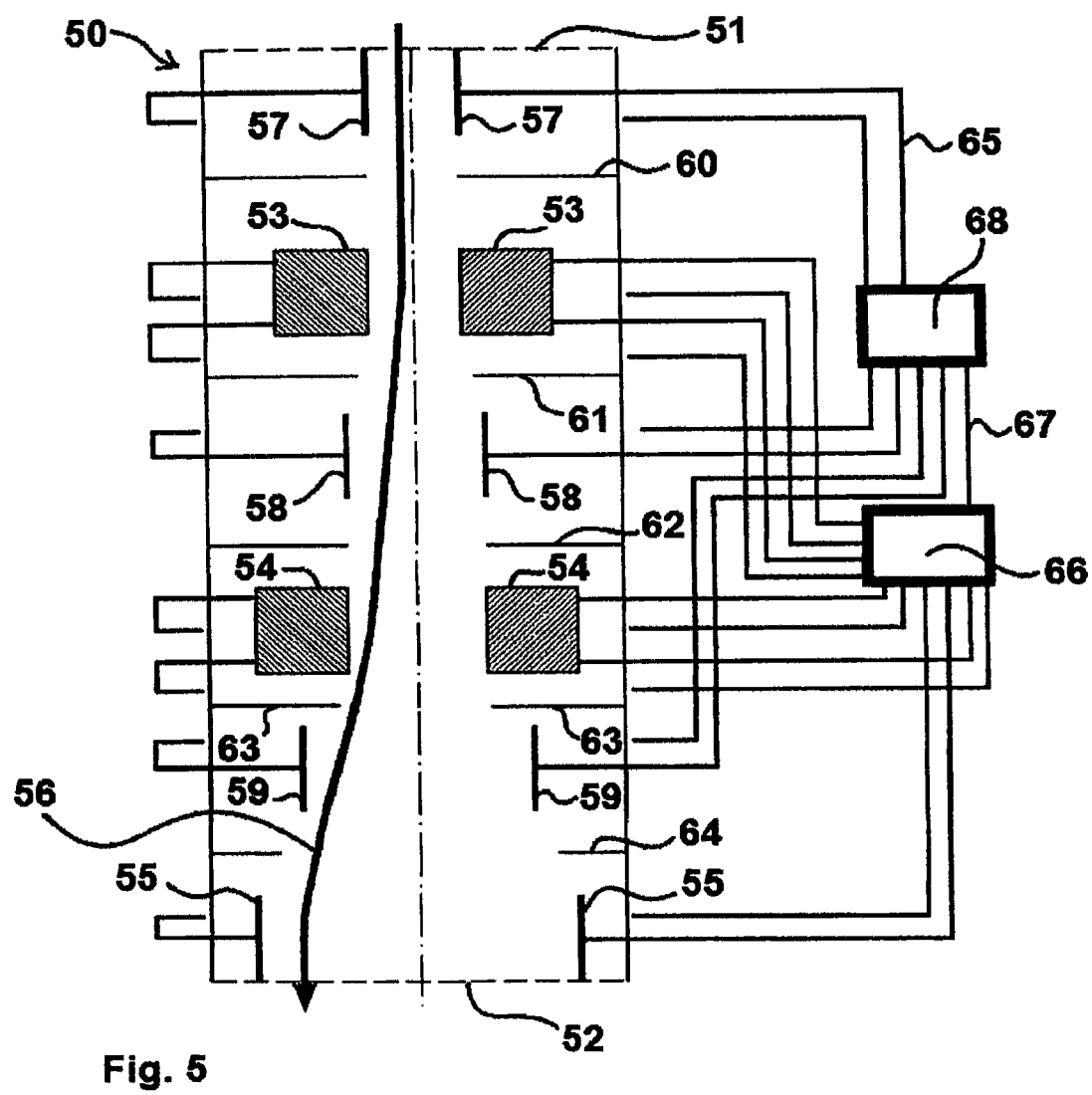

The drawing shows a model embodiment of a device according to the invention. Illustrations:

FIG. 1 First model embodiment of a device for positioning individual particles on a substrate in a side view, FIG. 2 Second model embodiment of a device for positioning individual particles on a substrate in a side view, FIG. 3 First model embodiment of a focusing unit for a device for positioning individual particles on a substrate in a side view, FIG. 4 First model embodiment of a deflector unit for a device for positioning individual particles on a substrate in a side view, FIG. 5 Second model embodiment of a deflector unit for a device for positioning individual particles on a substrate in a side view.

DESCRIPTION OF THE MODEL EMBODIMENTS

FIG. 1 represents a first model embodiment of a device for positioning individual particles with a particle source 1, a particle depot 2, a deflector unit 3, a focusing unit 4 and a substrate holder 5 with a substrate 6. Particles are separated from the substance contained in the particle depot 2 and are isolated in the particle source 1. The isolated particles emerge from the particle source 1 through an opening 7 and enter the deflector unit 3 through an entry window 8. In the deflector unit 3, the isolated particles are exposed to specific, controlled forces that impose a defined path upon the particles. At the end facing away from the particle source, the particles leave the deflector unit 3 through an exit window 9 and enter the focusing unit 4 through an entry window 10. In the focusing unit, the particles are guided towards the substrate 6 into their defined position. They leave the focusing unit 4 through an exit window 11 and are deposited on the substrate 5.

FIG. 2 represents a second model embodiment of a device for the deposition of particles on a substrate. In addition to the particle source 1, the particle depot 2, the deflector unit 14, the focusing unit 15 and the substrate holder 5, the device according to the second model embodiment exhibits an ionization unit 12 and a magnetization unit 13. In the ionization unit 12, the isolated particles emerging from the opening 7 of the particle source 1 are ionized and then magnetized in the magnetization unit.

FIG. 3 represents a first model embodiment of the focusing unit 15, which is part of the device according to FIG. 2. At the side facing upwards, the particles enter the focusing unit 15 through an entry window 16. At the lower end, the particles leave the focusing unit 15 through an exit window 17. Electrostatic components 18, 19 and two electromagnetic components 20, 23 are arranged between the entry window 16 and the exit window 17 of the deflector unit. The electrostatic components 18, 19 are electrodes. They generate an electrical field in which a force acts on the ionized particles. This force deflects the particles away from a straight path. In the focusing unit the electromagnetic components 20, 23 generate an electromagnetic field under the influence of which a force acts on the particles. It causes the particles to move along the path 24. The particles leave the focusing unit 15 through the exit window 17 and are positioned on the substrate 25, which is arranged on the substrate holder 26. The specific deflection of the particles onto a path 24 ensures that the particles are positioned exactly on a substrate 25. The exact positioning is highlighted by the tip of the arrow in FIG. 3, which represents the path 24. The focusing unit 15 is equipped with a housing 27. The housing exhibits a conical shape that tapers towards the substrate holder. Other housing shapes, such as a cylindrical shape or a cuboid, are equally possible.

FIG. 4 represents a first model embodiment of a deflector unit 30. It exhibits an entry window 31 and an exit window 32. In addition, several electrical components 33, 34 and 35 are arranged in the deflector unit. These generate an electromagnetic field in which the ionized particles undergo deflection. The path 36 along which the particles move from the entry window 31 to the exit window 32 is represented by an arrow in FIG. 4. Position sensors 37, 38 and 39 are arranged close to the entry window 31 and between the electrical components 33, 34 and 35. They are part of a measuring unit with which the deflector unit is equipped. They are used to determine the position of the particles in the corresponding section of the deflector unit 30. Shields 40, 41, 42, 43 and 44 are arranged between the electrical components 33, 34, 35 and the position sensors 37, 38, 39. The electrical components 33, 34, 35 are connected to a current/voltage supply 46 by connections 45. The position sensors 37, 38, 39 are connected to a controller 48 by connections 47. The controller 48 is in turn connected to the current/voltage supply 46. In this way, the electrical components 33, 34, 35 can be controlled by the controller 48 based on the particle positions determined by the position sensors 37, 38, 39. The deflector unit 30 is equipped with a housing 49, which exhibits a cylindrical shape. Other shapes are possible.

FIG. 5 represents a second model embodiment of a deflector unit 50. It exhibits an entry window 51 and an exit window 52. Two electromagnetic components 53, 54 and an electrostatic component 55 are arranged in the deflector unit 50. These components generate an electromagnetic field in which the ionized particles undergo deflection. The path 56 along which the particles move from the entry window 51 to the exit window 52 is represented by an arrow in FIG. 5. Position sensors 57, 58 and 59 are arranged close to the entry window 51 and between the electrical components 53, 54 and 55. The position sensors are part of a measuring unit with which the deflector unit is equipped. They are used to determine the position of the particles in the corresponding section of the deflector unit 50. Shields 60, 61, 62, 63 and 64 are arranged between the electrical components 53, 54, 55 and the position sensors 57, 58, 59. The electrical components 53, 54, 55 are connected to a current/voltage supply 66 by connections 65. The position sensors 57, 58, 59 are connected to a controller 68 by connections 67. The controller 68 is in turn connected to the current/voltage supply 66. In this way, the electrical components 53, 54, 55 can be controlled by the controller 68 based on the particle positions determined by the position sensors 57, 58, 59. The deflector unit 50 is equipped with a housing 69, which exhibits a cylindrical shape. Other shapes are possible.

In the representations according to FIGS. 3, 4 and 5, the electrical components 18, 19, 33, 34, 35, 53, 54, 55 are only identifiable in a side view. In each case this shows only two opposing electrodes. In actual fact there may be several electrodes arranged in a section of the deflector unit or focusing unit, in pairs opposite each other. This is the case for example for four, six or eight electrodes. In this way, deflection of the particles in several directions is possible.

Each of the three deflector units 14, 40 and 50 can be integrated into a device according to FIG. 1 or FIG. 2.

All features of the invention can be material to the invention both individually and in any combination.

REFERENCE NUMBERS

1 Particle source
2 Particle depot
3 Deflector unit
4 Focusing unit
5 Substrate holder
6 Substrate
7 Opening of particle source
8 Entry window of deflector unit
9 Exit window of deflector unit
10 Entry window of focusing unit
11 Exit window of focusing unit
12 Ionization unit
13 Magnetization unit
14 Deflector unit
15 Focusing unit
16 Entry window of focusing unit
17 Exit window of focusing unit
18 Electrostatic component
19 Electrostatic component
20 Electromagnetic component
21
22
23 Electromagnetic component
24 Particle path
25 Substrate
26 Substrate holder
27 Housing of focusing unit
28
29
30 Deflector unit
31 Entry window
32 Exit window
33 Electrical component
34 Electrical component
35 Electrical component
36 Particle path
37 Position sensor
38 Position sensor
39 Position sensor
40 Shield
41 Shield
42 Shield
43 Shield 44 Shield
45 Electrical connection
46 Current/voltage supply
47 Electrical connection
48 Controller
49 Housing
50 Deflector unit
51 Entry window
52 Exit window
53 Electrical component
54 Electrical component
55 Electrical component
56 Particle path
57 Position sensor
58 Position sensor
59 Position sensor
60 Shield
61 Shield
62 Shield
63 Shield
64 Shield
65 Electrical connection
66 Current/voltage supply
67 Electrical connection
68 Controller
69 Housing

The invention claimed is:

1. Device for positioning individual particles on a substrate, the device comprising
at least one particle source isolating particles of a defined material,
a focusing unit with
a focusing unit entry window facing the at least one particle source and
a focusing unit exit window facing away from the at least one particle source,
a substrate holder holding the substrate, wherein the substrate held by the substrate holder is arranged at the focusing unit exit window, and wherein the focusing unit guides the particles entering through the focusing unit entry window into defined positions on the substrate,
at least one deflection unit arranged between the at least one particle source and the focusing unit with
a deflection unit entry window facing the at least one particle source and
a deflection unit exit window facing away from the at least one particle source, wherein the at least one deflection unit preconditions the particles entering through the deflection unit entry window before the particles reach the focusing unit,
at least one measuring unit disposed in the at least one deflection unit and determining location and/or speed of the particles in the at least one deflection unit, and
at least one controller controlling the at least one deflection unit in accordance with readings from the at least one measuring unit,
wherein the at least one deflection unit comprises a first electrical component and a second electrical component, each of the first electrical component and the second electrical component generating respective electromagnetic fields and being disposed in the at least one deflection unit between the deflection unit entry window and the deflection unit exit window, and
wherein the at least one measuring unit comprises a first sensor disposed downstream from the first electrical component and disposed upstream from the second electrical component.

2. Device according to claim 1, wherein the at least one particle source is equipped with a particle depot, and wherein the particles are separated from the particle depot.

3. Device according to claim 1, further comprising at least one ionization unit ionizing the particles isolated by the at least one particle source.

4. Device according to claim 3, wherein the ionization unit is equipped with at least one laser.

5. Device according to claim 1, further comprising at least one magnetization unit imparting a magnetic moment to the particles isolated by the at least one particle source.

6. Device according to claim 1, further comprising at least one filter unit allowing particles with defined characteristics to pass and separating other particles.

7. Device according to claim 1, wherein the focusing unit is equipped with electrical components generating electromagnetic fields.

8. Device according to claim 1, wherein the first and second electrical components are electrostatic components and/or electromagnetic components.

9. Device according to claim 7, wherein the electrical components are coils, coils with magnetic core, annular yokes, saddle coils or electrodes.

10. Device according to claim 1, wherein the substrate holder is equipped with at least one electrical connection, and wherein the substrate holder can be connected to a current/voltage source via the at least one electrical connection.

11. Device according to claim 1, wherein the at least one measuring unit is equipped with at least one position sensor determining location of the particles in three dimensions.

12. Device according to claim 1, wherein the at least one measuring unit is equipped with at least one speed sensor determining speed of the particles in three dimensions.

13. Device according to claim 1, wherein the substrate holder is arranged in a movable manner and wherein the substrate holder can be located with a precision in the nanometer range.

14. Device according to claim 1, further comprising at least one temperature control unit, wherein temperature of the at least one particle source and/or the at least one deflector unit and/or the substrate holder can be adjusted at least by stages via the at least one temperature control unit.

15. Process for positioning individual particles on a substrate, comprising steps of
isolating the individual particles by a particle source,
after the isolating, exiting of the individual particles from the particle source,
measuring, in a deflection unit, location and/or speed of each particle by a measuring unit, the measuring unit being disposed in the deflection unit, the deflection unit comprising a first electrical component and a second electrical component, each of the first electrical component and the second electrical component being disposed in the at least one deflection unit between the deflection unit entry window and the deflection unit exit window, and the measuring unit comprising a first sensor disposed downstream from the first electrical component and disposed upstream from the second electrical component,
deflecting and preconditioning the individual particles by the first electrical component and the second electrical component of the deflection unit as each of the first electrical component and the second electrical component generates a respective electromagnetic field,
controlling the first electrical component and the second electrical component of the deflection unit in accordance with readings by a controller, after the deflecting and the preconditioning, introducing the individual particles through a focusing unit entry window into a focusing unit, the focusing unit having a focusing unit exit window, the substrate being arranged on a substrate holder at the focusing unit exit window, conditioning the individual particles in the focusing unit, and arranging the individual particles in defined positions on the substrate.

16. Process according to claim 15, wherein the individual particles are separated from a particle depot prior to the isolating.

17. Process according to claim 15, wherein boundary conditions and process parameters are defined and entered in the controller.

18. Process according to claim 15, wherein the individual particles are ionized.

19. Process according to claim 15, wherein the individual particles are imparted with a magnetic moment.

20. Process according to claim 15, wherein after the isolating of the individual particles the individual particles are filtered.

21. Process according to claim 15, wherein the electromagnetic fields are constant fields and/or alternating fields of a selected shape.

22. Process according to claim 15, wherein the substrate is connected to a current/voltage source via the substrate holder, and wherein an electrical potential of the substrate holder is adjusted by the controller.

23. Process according to claim 15, wherein the location of each individual particle is measured by the measuring unit, wherein the measuring unit comprises at least one position sensor, and wherein the location is determined in three dimensions by the at least one position sensor.

24. Process according to claim 15, wherein the speed of each individual particle is measured by the measuring unit, wherein the measuring unit comprises at least one speed sensor, and wherein the speed is determined in three dimensions by the at least one speed sensor.

25. Process according to claim 15, wherein the substrate holder is movable, wherein movement of the substrate holder is controlled by the controller, and wherein the substrate holder is located with a precision in the nanometer range.

26. Process according to claim 15, wherein temperature of the particle source and/or the deflector unit and/or the substrate holder can be adjusted at least in stages by a temperature control unit, and wherein the temperature is controlled by the controller.

27. A microscope comprising a device for positioning individual particles on a substrate, the device comprising:

at least one particle source isolating particles of a defined material, a focusing unit with
a focusing unit entry window facing the at least one particle source and
a focusing unit exit window facing away from the at least one particle source, a substrate holder holding the substrate, wherein the substrate held by the substrate holder is arranged at the focusing unit exit window, and wherein the focusing unit guides the particles entering through the focusing unit entry window into defined positions on the substrate, at least one deflection unit arranged between the at least one particle source and the focusing unit with
a deflection unit entry window facing the at least one particle source and
a deflection unit exit window facing away from the at least one particle source, wherein the at least one deflection unit preconditions the particles entering through the deflection unit entry window before the particles reach the focusing unit, at least one measuring unit disposed in the at least one deflection unit and determining location and/or speed of the particles in the at least one deflection unit, and at least one controller controlling the at least one deflection unit in accordance with readings from the at least one measuring unit, wherein the at least one deflection unit comprises a first electrical component and a second electrical component, each of the first electrical component and the second electrical component generating respective electromagnetic fields and being disposed in the at least one deflection unit between the deflection unit entry window and the deflection unit exit window, and wherein the at least one measuring unit comprises a first sensor disposed downstream from the first electrical component and disposed upstream from the second electrical component.

28. Device according to claim 1, wherein the device has a device longitudinal axis running through a center of the focusing unit entry window, a center of the focusing unit exit window, a center of the deflection unit entry window, and a center of the deflection unit exit window.

* * * * *